(12) United States Patent
Achenbach

(10) Patent No.: US 9,395,603 B2
(45) Date of Patent: Jul. 19, 2016

(54) CAMERA POSITIONING AND MOUNTING SYSTEM WITH IMPROVED MOUTH ADAPTER

(71) Applicant: Kenneth John Achenbach, Whistler (CA)

(72) Inventor: Kenneth John Achenbach, Whistler (CA)

(*) Notice: Subject to any disclaimer, the term of this patent is extended or adjusted under 35 U.S.C. 154(b) by 0 days.

(21) Appl. No.: 14/491,320

(22) Filed: Sep. 19, 2014

(65) Prior Publication Data

US 2015/0076184 A1    Mar. 19, 2015

Related U.S. Application Data

(60) Provisional application No. 61/879,842, filed on Sep. 19, 2013, provisional application No. 61/903,013, filed on Nov. 12, 2013, provisional application No. 61/921,116, filed on Dec. 27, 2013, provisional application No. 61/992,319, filed on May 13, 2014.

(51) Int. Cl.

| *A45B 11/04* | (2006.01) |
| *A45F 3/14* | (2006.01) |
| *G03B 17/56* | (2006.01) |
| *F16M 11/28* | (2006.01) |
| *F16M 13/04* | (2006.01) |

(52) U.S. Cl.
CPC .............. *G03B 17/561* (2013.01); *F16M 11/28* (2013.01); *F16M 13/04* (2013.01)

(58) Field of Classification Search
CPC ......... G03B 17/561; F16M 11/00; A42B 1/24
USPC ........................................ 224/181; 2/209.13
See application file for complete search history.

(56) References Cited

U.S. PATENT DOCUMENTS

| 2,357,377 A | * | 9/1944 | Bausch | F16M 13/04 359/409 |
| 2,651,981 A | * | 9/1953 | Calhoun | F16M 13/04 206/820 |
| 2,952,200 A | * | 9/1960 | Welch | F16M 13/04 224/623 |
| 3,418,461 A | * | 12/1968 | Sedlock | F21L 4/00 362/191 |
| 4,449,787 A | * | 5/1984 | Burbo | A42B 3/042 313/524 |
| 5,074,295 A | * | 12/1991 | Willis | A61F 4/00 128/200.24 |
| 5,103,384 A | * | 4/1992 | Drohan | F16M 11/40 362/190 |
| 6,028,627 A | * | 2/2000 | Helmsderfer | A42B 3/042 345/8 |
| 6,098,627 A | * | 8/2000 | Kellner | A61C 5/14 128/859 |
| 7,186,159 B1 | * | 3/2007 | Baxter | A42B 1/12 2/422 |

(Continued)

*Primary Examiner* — Nathan J Newhouse
*Assistant Examiner* — Jennifer N Zettl
(74) *Attorney, Agent, or Firm* — Patentfile, LLC; Bradley C. Fach; Steven R. Kick

(57) ABSTRACT

A mouth adapter configured to secure a portable camera comprising a first bite wing, a second bite wing, an air channel located between the first bite wing and the second bite wing, an adapter arm connecting the first bite wing and the second bite wing, and a camera mount coupled to the adapter. The bite wings may be elongated and comprise a bite surface made from an elastic polymer which may be configured to make contact with the teeth of a user as they bite onto the bite surface. In further preferred embodiments, the mouth adapter comprises a first balance ridge and second balance ridge protruding from the adapter arm proximate to the first and second bite wings with an air groove positioned between said the balance ridges. The air groove may be located within the adapter arm and proximate to intersection of the bite wings.

18 Claims, 13 Drawing Sheets

(56) References Cited

U.S. PATENT DOCUMENTS

| | | | | |
|---|---|---|---|---|
| 8,014,656 B2 * | 9/2011 | Woodman | B63B 25/002 | 369/25 |
| 8,063,934 B2 * | 11/2011 | Donato | A42B 3/042 | 345/8 |
| 8,757,831 B2 * | 6/2014 | Waters | A42B 1/244 | 200/566 |
| 8,837,928 B1 * | 9/2014 | Clearman | E05B 17/2019 | 206/316.2 |
| 8,857,775 B1 * | 10/2014 | Clearman | G03B 17/561 | 24/334 |
| 2004/0006804 A1 * | 1/2004 | Bush | A63B 71/085 | 2/9 |
| 2004/0103905 A1 * | 6/2004 | Farrell | A63B 71/085 | 128/861 |
| 2005/0113654 A1 * | 5/2005 | Weber | A61B 5/01 | 600/309 |
| 2005/0236003 A1 * | 10/2005 | Meader | A61F 5/566 | 128/848 |
| 2006/0174897 A1 * | 8/2006 | Sarkisian | A61F 5/566 | 128/859 |
| 2006/0219250 A1 * | 10/2006 | Farrell | A63B 71/085 | 128/859 |
| 2008/0283422 A1 * | 11/2008 | Jansheski | B65D 43/164 | 206/63.5 |
| 2008/0313792 A1 * | 12/2008 | Pino | A42B 3/225 | 2/427 |
| 2009/0221884 A1 * | 9/2009 | Ryan | A61B 5/682 | 600/301 |
| 2009/0229043 A1 * | 9/2009 | Cyr | A42B 3/22 | 2/422 |
| 2013/0066236 A1 * | 3/2013 | Herman | A63B 71/085 | 600/595 |
| 2014/0105589 A1 * | 4/2014 | Samuels | F16F 7/00 | 396/421 |
| 2014/0261461 A1 * | 9/2014 | O'Donoghue | A63B 71/085 | 128/861 |

* cited by examiner

CAMERA POSITIONING AND MOUNTING SYSTEM WITH IMPROVED MOUTH ADAPTER

CROSS REFERENCE TO RELATED APPLICATIONS

The present application claims priority to, U.S. provisional patent application No. 61/879,842 filed Sep. 19, 2013, and entitled "NOVEL CAMERA MOUNTING SYSTEM AND ACCESSORIES", and also to U.S. provisional patent application No. 61/903,013 filed Nov. 12, 2013, and entitled "NOVEL CAMERA POSITIONING AND MOUNTING SYSTEM", and also to U.S. provisional patent application No. 61/921,116 filed Dec. 17, 2013, and entitled "NOVEL CAMERA POSITIONING AND MOUNTING SYSTEM WITH IMPROVED MOUTH ADAPTER", and also to U.S. provisional patent application No. 61/992,319 filed May 13, 2014, and entitled "NOVEL CAMERA POSITIONING AND MOUNTING SYSTEM WITH IMPROVED MOUTH ADAPTER", the entire contents of the above-referenced patent applications are incorporated by reference herein.

FIELD OF THE INVENTION

The present invention relates to novel camera positioning and mounting systems. More particularly, the invention relates to a modular quick release camera mounting and positioning system.

BACKGROUND

In the world of extreme sports filmmaking there are hundreds of different types of filming equipment. Unfortunately, this field is divided. Cheap equipment does not provide the quality needed by many filmmakers, and professional equipment is bulky and expensive, often requiring trained personnel to operate. Filming and photographing extreme sports on location with professional equipment and a film crew is prohibitively expensive for most filmmakers, while cheap equipment can break or lead to poor quality results.

An example of a professional image capturing system can be seen in U.S. patent application Ser. No. 11/470,461 filed on Sep. 6, 2006 by Giegerich et al. which describes a structure and method capable of positioning cameras for multiple viewing angles. This structure and method requires a significant investment of time, personnel, and finances in order to use, and is therefore outside the reach of the majority of filmmakers. Also, many on location environments are unable to support this setup.

Often the filmmaker is the only person on the film crew and is also required to appear in the shot. To get these shots, filmmakers have created all sorts of homemade attachments, accessories, and mounts which are frequently made from sticks, cardboard, scavenged parts, and even duct tape. These temporary solutions are specific to each filmmaker's needs for a particular situation and must be disassembled once the needs or available equipment changes. A significant amount of time and money can be wasted on trying to fabricate or reconfigure a camera mount for different situations resulting in longer and more expensive film production.

While there are camera mounting and positioning systems in the art, they are limited in many aspects. They are configured for a limited amount of mounting and positioning options and are unable to work with different systems and cameras resulting in the filmmaker needing multiple systems for each video shoot.

Therefore a need exists for a novel camera positioning and mounting system capable of accepting and receiving different cameras and accessories. There is also a need for the system to be able to secure the camera to a variety of structures in order to accommodate small or no film crew situations. Finally, there is a need for the system to be rapidly reconfigurable and interchangeable to adapt to different environments.

BRIEF SUMMARY OF THE INVENTION

A novel camera positioning and mounting system with improved mouth adapter is provided. In preferred embodiments, the mouth adapter is configured to secure a portable camera, and the adapter comprises a first bite wing, a second bite wing, an air channel located between the first bite wing and the second bite wing, an adapter arm connecting the first bite wing and the second bite wing, and a camera mount coupled to the adapter. The bite wings may be elongated and comprise a bite surface configured to make contact with and form recessed cavities which align to protruding teeth of a user as they bite onto the bite surface. The bite surface may be made from an elastic polymer such as ethylene vinyl acetate, and may be over molded to the distal ends of the bite wings.

In further preferred embodiments, the mouth adapter comprises a first balance ridge and second balance ridge protruding from the adapter arm proximate to the first and second bite wings with an air groove positioned between said the balance ridges. The air groove may be located within the adapter arm and proximate to intersection of the bite wings.

In yet further preferred embodiments, the adapter arm may be curved and comprises a neck. The neck may comprise a first side neck surface and second side neck surface with the first and second neck side surfaces tapered to meet a neck front surface and a neck back surface.

In still further preferred embodiments, the camera mount comprises a first outer vertical prong, a second outer vertical prong, an inner vertical prong, and prong cavities located between the first and second outer vertical prongs and the inner vertical prong with the first outer vertical prong and second outer vertical prong each comprising a width greater than a width of the inner vertical prong.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New camera positioning and mounting system with improved mouth adapter are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
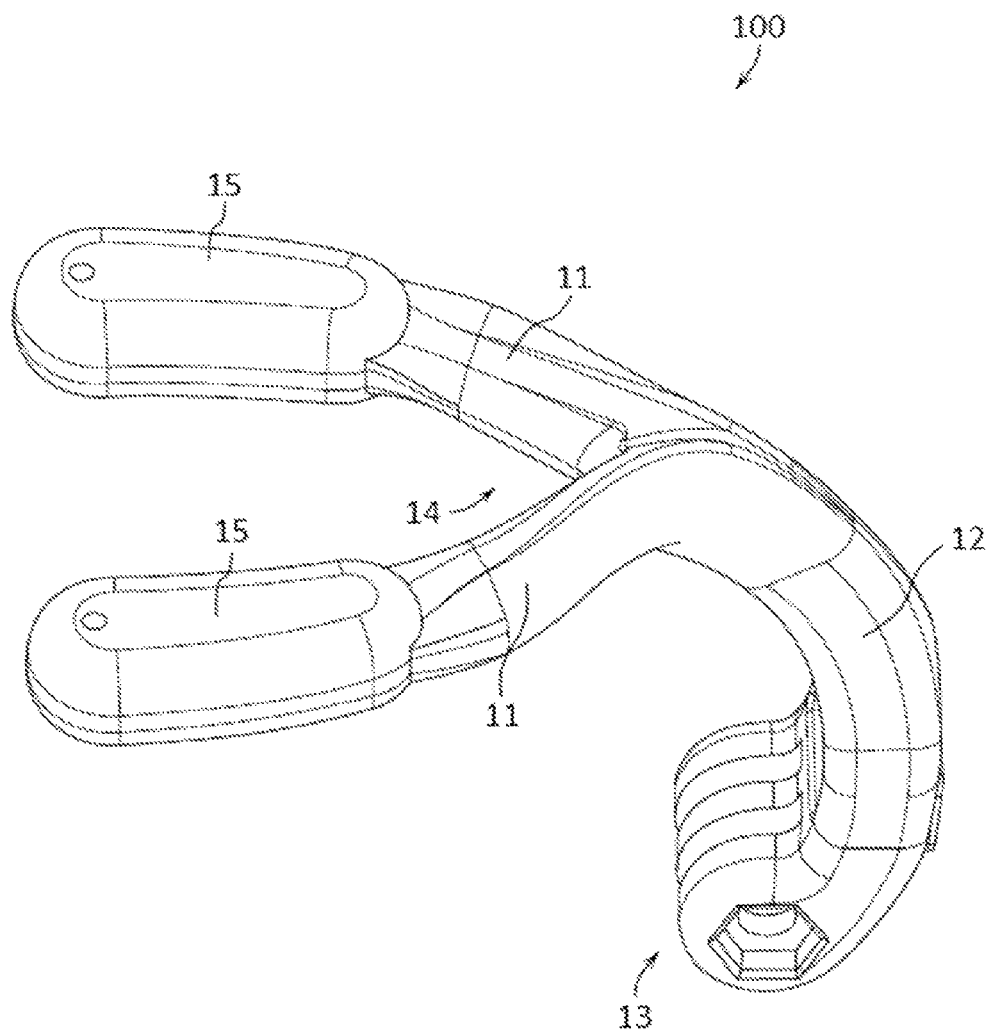
FIG. 1 depicts a perspective view of an example of an improved mouth adapter according to various embodiments described herein.

The present invention will now be described by example and through referencing the appended figures representing preferred and alternative embodiments. FIG. 1 illustrates an example of an improved mouth adapter ("the adapter") 100 according to various embodiments. In this example, the adapter 100 comprises two bite wings 11, an adapter arm 12, and a camera mount 13. In preferred embodiments, the first and second bite wings 11 are coupled to a first end of the adapter arm 12, while the camera mount 13 is coupled to a second end of the adapter arm 12. In some embodiments, the first and second bite wings 11, adapter arm 12, and camera mount 13 may be coupled, connected, removably connected, or integrally formed or molded with the adapter 100.

In some embodiments, the bite wings 11, adapter arm 12, and camera mount 13 may be made from injected molded nylon, glass filled nylon, plastic, metal alloys, carbon fiber, or other similar materials, and they may be coupled or connected together with heat bonding, chemical bonding, adhesives, clasp type fasteners, clip type fasteners, rivet type fasteners, threaded type fasteners, other types of fasteners, or any other suitable joining method. In other embodiments, the bite wings 11, adapter arm 12, and camera mount 13 may be coupled or removably connected by being press fit or snap fit together, by one or more fasteners such as magnetic type fasteners, sealable tongue and groove fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, the bite wings 11, adapter arm 12, camera mount 13, and/or any other element described herein may be coupled by being one of connected to and integrally formed with another element of an adapter 100.

The two bite wings 11 are generally "U" shaped and preferably elongated to receive a user's teeth including one or more molars for accommodating the human bite pattern. In preferred embodiments, a bite wing 11 may comprise one or more bite surfaces 15 configured to provide a comfortable resilient surface for contacting the teeth of a user. The bite wings 11 are preferably placed between the teeth of the upper and lower jaws thereby holding the improved mouth adapter 100 in position as the user clenches their jaws together. The bite wings 11 are configured to be joined or coupled to the adapter arm 12 past the location of where the user's lips will contact the bite wings 11 as the bite wings 11 are placed between the teeth of the upper and lower jaws.

In preferred embodiments, the adapter 100 comprises an air channel 14 that is located between the two bite wings 11. By remaining separate from each other and from the adapter arm 12 until they extend past the user's lips, the bite wings 11 are configured to form and bound an air channel 14 or channel that permits a user to breathe through their mouth while the bite wings 11 are clenched between the user's upper and lower jaws. In other embodiments, an air channel 14 may comprise a conduit that is positioned on or in a bite wing 11 and/or adapter arm 12 of the adapter 100 to allow and facilitate oral breathing by a user while holding the adapter 100 in their mouth. In other embodiments, the air channel 14 may comprise one or more open depressions in the surface a bite wing 11, adapter arm 12, and/or neck 25 (FIGS. 3-6) of the adapter 100. In other embodiments, the air channel 14 may comprise one or more closed depressions or tunnels which pass through a bite wing 11 and/or adapter arm 12 of the improved mouth adapter 100.

A user may position the adapter 100 in their mouth so that the bite surface 15 on the bite wings 11 are positioned and held in place between their rearward teeth, while the air channel 14 is positioned to extend through and exit the mouth between their lips. Using the adapter 100, a user is able to record video footage in a variety of environments without using their hands in addition to being able to breathe through their mouth through the air channel 14. For example, a user may film while biking, jogging, skiing, snowboarding, surfing, or any other suitable activity by holding a camera attached to the adapter 100 in their teeth using the adapter 100.

The bite wings 11 may also comprise one or more bite surfaces 15 which may be joined or coupled to a bite wing 11 by being integrally molded or formed together, with heat bonding, chemical bonding, adhesives, clasp type fasteners, clip type fasteners, rivet type fasteners, threaded type fasteners, other types of fasteners, or any other suitable joining method. Bite surfaces 15 may optionally be positioned anywhere on the bite wings 11 of the adapter 100 and may be made of resilient plastic, foam, rubber, silicone, or other similar material that is suitable for being held between the upper and lower teeth of the user. In some preferred embodiments, a bite surface 15 may be over molded or made to completely surround and encase the distal ends of a bite wing 11 with the distal end of the bite wing generally referring to the end of the bite wing that is not joined to the adapter arm 12. In further preferred embodiments, a bite surface 15 may be made from an elastic polymer such as Ethylene-vinyl acetate (EVA), ethylene propylene rubber (EPM), ethylene propylene diene rubber (EPDM), Epichlorohydrin rubber (ECO), Polyacrylic rubber (ACM, ABR), Silicone rubber (SI, Q, VMQ), and like materials that may optionally be conformed to a user's dental bite pattern so as to form one or more recessed cavities which may align and receive the protruding teeth of a user as they bite onto a bite surface 15. In some embodiments, the bite surfaces 15 may be temporarily attached or coupled to the bite wings 11 of the improved adapter 100, and they may be interchangeable to allow different users to attach and use their own personal bite surfaces 15 which may be custom molded to their dental bite pattern. In other embodiments, the bite surfaces 15 may be permanently attached to or molded into the bite wings 11 of the adapter 100.

Figure 2:
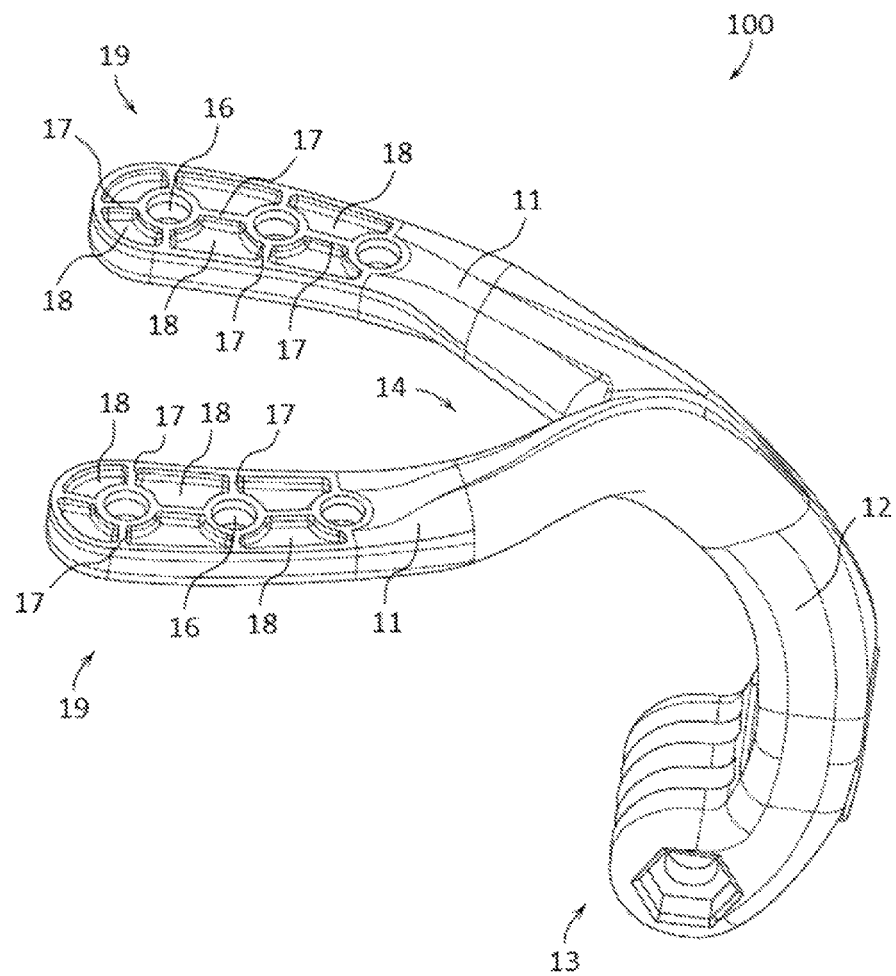
FIG. 2 illustrates a perspective view of an example of an improved mouth adapter without bite pads according to various embodiments described herein.

FIG. 2 illustrates a perspective view of an example of an improved mouth adapter without bite surfaces 15 (FIGS. 1, 3-6) according to various embodiments described herein. In some embodiments, like the one depicted in FIG. 2, a bite surface 15 may be configured to be joined or coupled to a bite wing 11 by placing portions of the bite surface 15 through one or more optional ports 16 or apertures located on the bite wing 11. In preferred embodiments, a port 16 may form a hole or aperture that may pass completely through a bite wing 11. In other embodiments, a port 16 may form a hole or aperture that may not pass completely through a bite wing 11. A bite surface 15 may be configured to be temporarily or permanently secured to a bite wing 11 by positioning a portion of a bite surface 15 into or through one or more optional ports 16 located on the bite wings 11 to provide a means to secure the bite surface 15 to the adapter 100. In some embodiments, the bite wings 11 may comprise between one and twenty ports 16. In further embodiments, the bite surfaces 15 may attach to the bite wings 11 with a tongue and groove like attachment means allowing the bite surfaces 15 to snap or slide on and off of the adapter 100 by connecting to each other through one or more ports 16.

In this and preferred embodiments, a bite wing 11 and bite surface 15 (FIGS. 1, 3-6) may be configured in a generally flattened elongated cylindrical shape configured to be secured between a user's upper and lower jaw. It should be understood to one of ordinary skill in the art that a bite wing 11 and bite surface 15 may be a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape that may be positioned and secured between a user's upper and lower jaw. It is not intended herein to mention all the possible alternatives, equivalent forms or ramifications of the invention. It is understood that the terms and proposed shapes used herein are merely descriptive, rather than limiting, and that various changes may be made without departing from the spirit or scope of the invention.

Also in preferred embodiments, a bite wing 11 may comprise a textured surface 19 which may comprise one or more textured peaks 17 and/or textured valleys 18. The textured peaks 17 and/or textured valleys 18 may provide a textured surface 19 configured to receive a bite surface 15 to maintain and secure the bite surface 15 on a bite wing 11. Textured peaks 17 may be generally raised above the textured valleys 18 and/or the surface of a bite wing 11, while textured valleys 18 may be generally depressed below the textured peaks 17 and/or the surface of a bite wing 11. Preferably, textured peaks 17 and textured valleys 18 may comprise a generally waffle pattern configuration; however, they may also be configured in any other shape or pattern.

Figure 3:
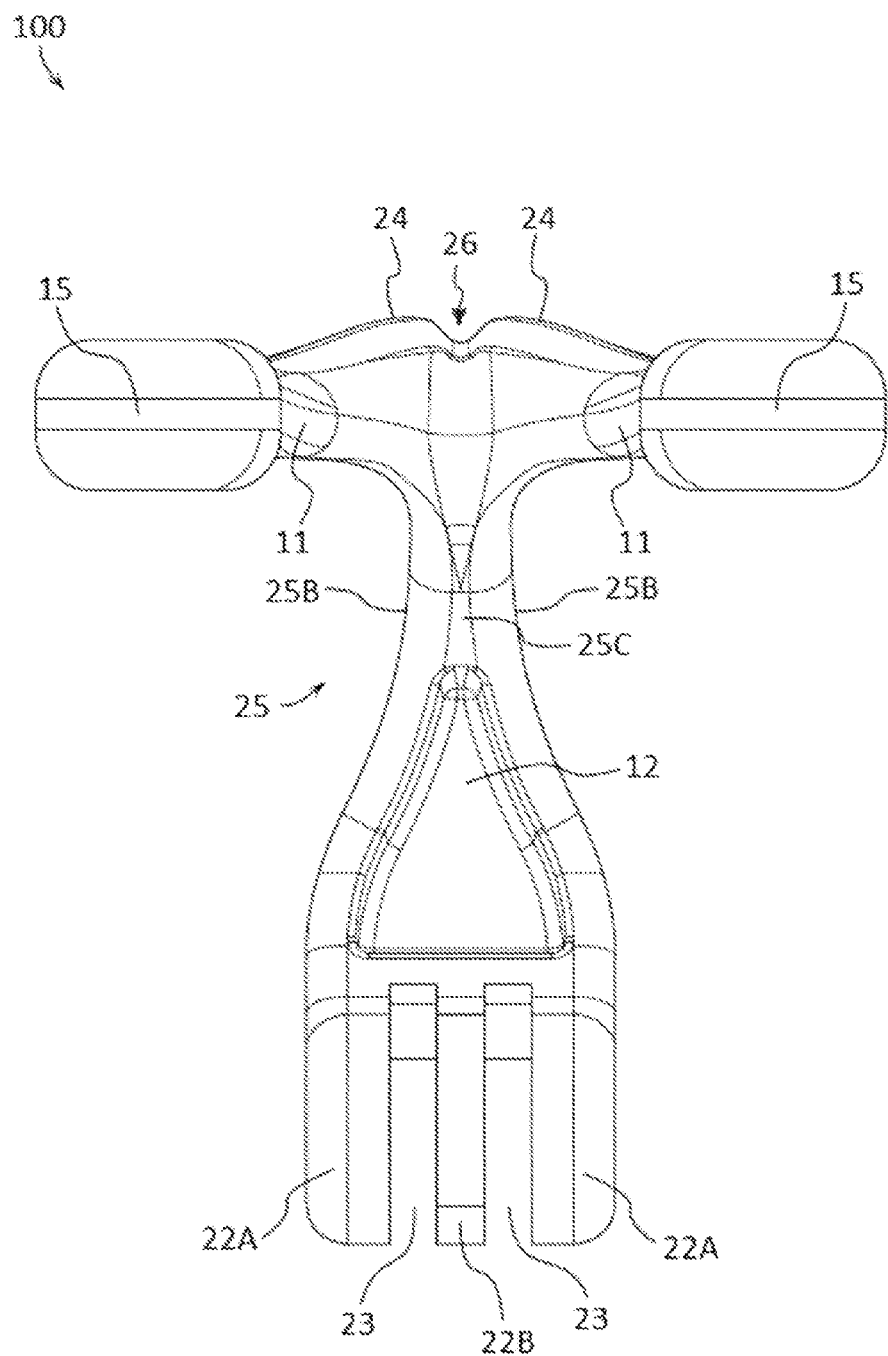
FIG. 3 shows an elevation view of the back of an example of an improved mouth adapter according to various embodiments described herein.
Figure 4:
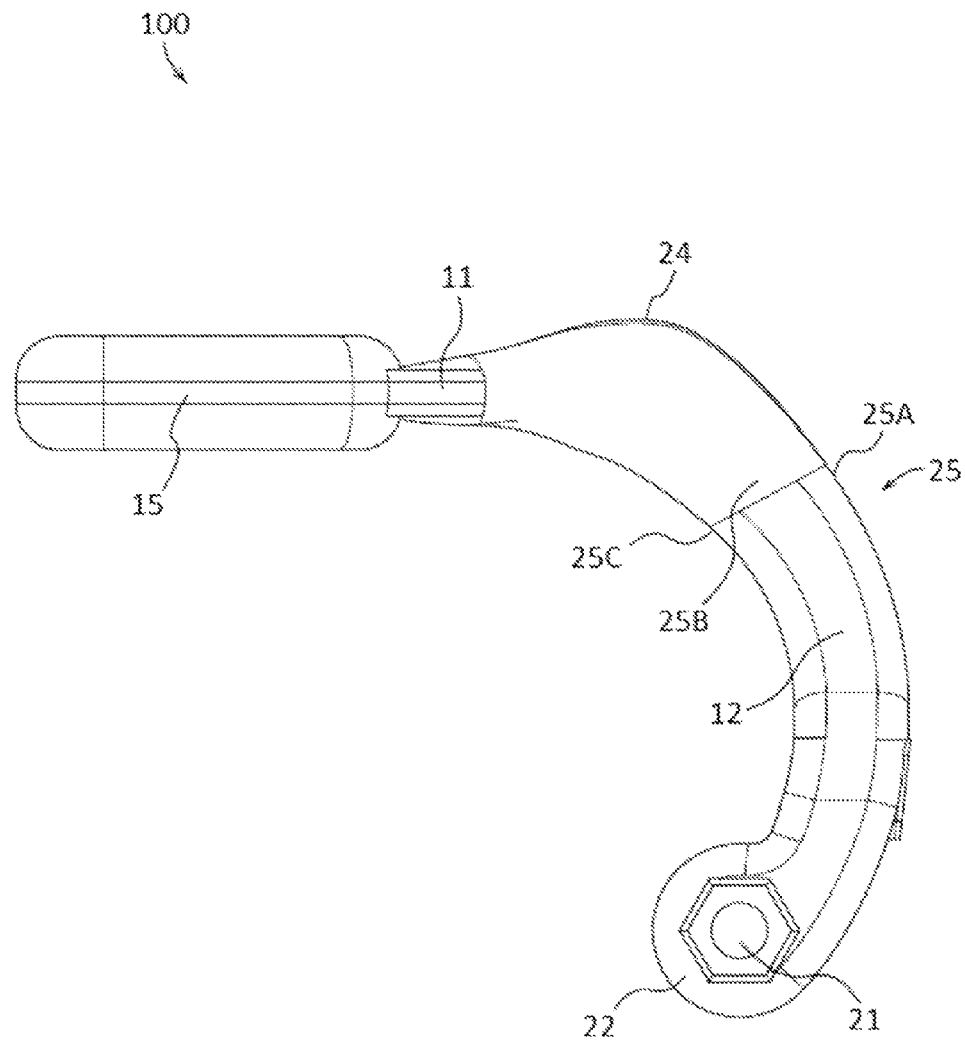
FIG. 4 depicts an elevation view of the side of an example of an improved mouth adapter according to various embodiments described herein.
Figure 5:
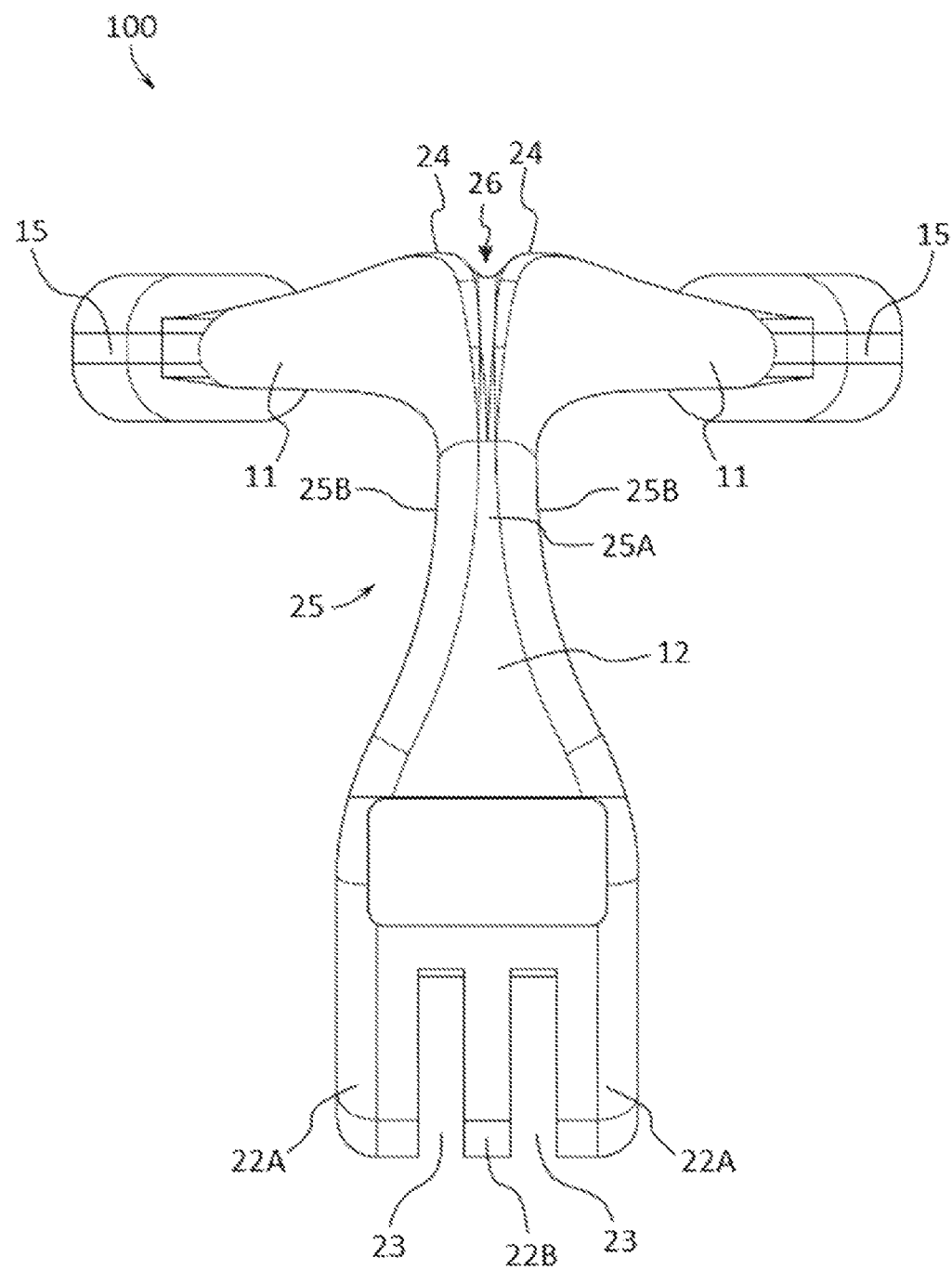
FIG. 5 illustrates an elevation view of the front of an example of an improved mouth adapter according to various embodiments described herein.

Turning now to FIGS. 3-5, an elevation view of the back of an example of an improved mouth adapter 100, an elevation view of the side of an example of an improved mouth adapter 100, and an elevation view of the front of an example of an improved mouth adapter 100 according to various embodiments are shown respectively. In preferred embodiments, a camera mount 13 may comprise one or more vertical prongs 22 and one or more cavities 23 located between two vertical prongs 22 that are configured to attach to one cavity and to two vertical prongs, which typically comprise fastener apertures, and which are found on cameras and camera cases common in the art. The vertical prongs of a camera case, camera, or other device may be placed into the cavities 23 and in contact with the vertical prongs 22 of the adapter 100. A fastener aperture 21 may pass through each of the vertical prongs of the camera mount 13 of the adapter 100. A fastener such as a screw or bolt may then be passed through the fastener apertures 21 of the vertical prongs 22 of the adapter 100 and through fastener apertures on vertical prongs of the camera or camera case. The fastener may be secured by a nut type fastener to allow a camera attached to the adapter 100 to swivel or rotate around the axis provided by the fastener.

In preferred embodiments, a camera mount 13 may comprise three vertical prongs 22 with the outer vertical prongs 22A optionally comprising greater width than the inner vertical prong 22B as shown in FIGS. 3 and 5. In other embodiments, one or more outer vertical prongs 22A may comprise a similar width as one or more inner vertical prongs 22B. In further embodiments, one or more outer vertical prongs 22A, inner vertical prongs 22B and/or cavities 23 may comprise any size or shape configured to receive and secure one or more vertical prongs or other similar attachment found on cameras, camera cases, and like devices common in the art.

In other embodiments, a camera mount 13 may comprise a clip attachment, threaded attachment, a ballhead mount, a pan-tilt mount, a strap or webbing mount, or any other type of camera mount suitable for attaching a camera, camera case, and like devices to other objects.

Figure 6:
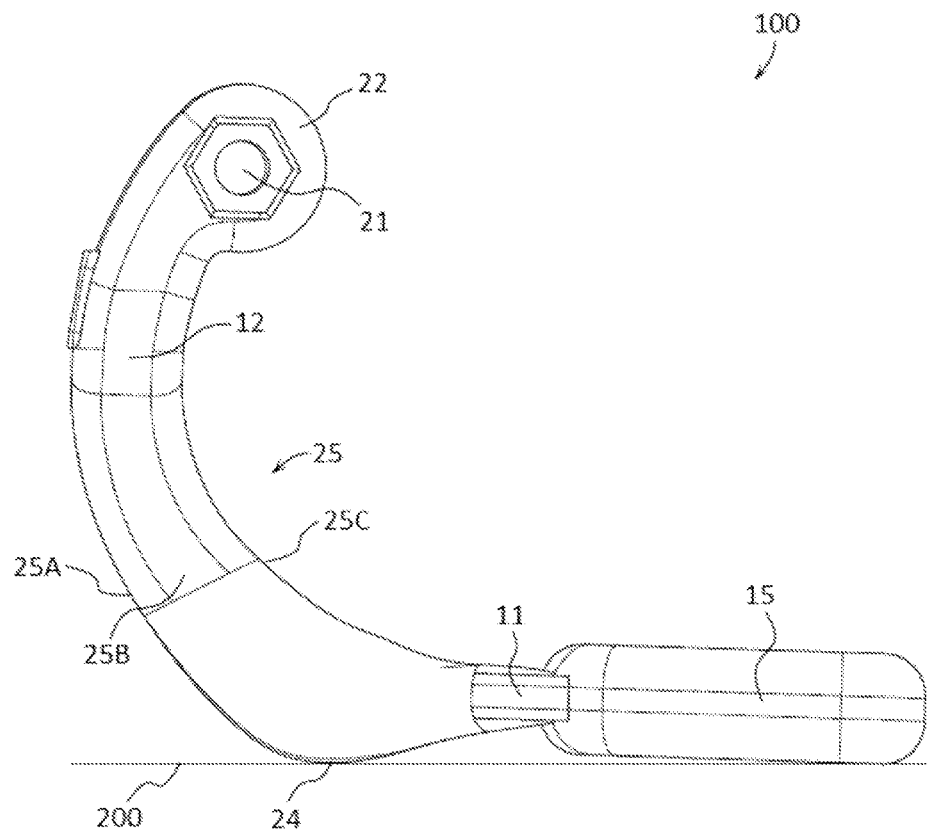
FIG. 6 shows an elevation view of the side of an example of an improved mouth adapter resting on a surface according to various embodiments described herein.

As perhaps best illustrated in FIGS. 3 and 5, in preferred embodiments, the adapter 100 may comprise two balance ridges 24. In other embodiments, an adapter 100 may optionally comprise one or more balance ridges 24. A balance ridge 24 may be configured to extend up from the adapter arm 12 and away from the camera mount 13 of the adapter 100 so that when placed on a surface 200, as shown in FIG. 6, the balance ridges 24 may contact the surface 200. An adapter 100 may be configured to rest or balance on a surface 200 by placing the balance ridges 24, bite wings 11, and/or bite surfaces 15 in contact with the surface 200 providing a tripod or three point contact with the surface 200 so that one or more balance ridges 24 form a first contact point and the two bite wings 11 and/or bite surfaces 15 form a second and third contact points. A balance ridge 24 may joined to an adapter arm 12, a bite wing 11, and/or a bite surface 15 by being integrally molded or formed together or with any other suitable joining method. In preferred embodiments, an adapter arm 12 comprises a first balance ridge 24 and second balance ridge 24 protruding from the adapter arm 12 proximate to the first and second bite wings 11.

In further preferred embodiments, an adapter arm 12 may comprise one or more air grooves 26 which may form a depression or conduit between two or more balance ridges 24, and preferably located proximate to the intersection of the first and second bite wings 11 as shown in FIGS. 3 and 5. In some embodiments, one or more air grooves 26 may facilitate the passage of air through the air channel 14 (FIGS. 1 and 2) and therefore facilitate the breathing of a user with the adapter clenched between their jaws. Air groove 26 may be in a "V" shaped design profile, "U" shaped design profile, "W" shaped design profile, or any suitable shaped design profile to facilitate the passage of air across the adapter 100. In further embodiments, an adapter arm 12 may comprise an air groove 26 placed on one or both sides of a balance ridge 24. In still further embodiments, an adapter arm 12 may comprise one or more air grooves 26 without a balance ridge 24.

Also in preferred embodiments, an adapter arm 12 of an adapter 100 may comprise a neck 25 or pinch point to be easily grasped by the user with the neck 25 and/or adapter arm 12 comprising a generally curved shape as shown in FIGS. 1, 2, 4, and 6 although the neck 25 and/or adapter arm 12 may be configured in other shapes. A neck 25 may comprise a generally thinner neck front surface 25A and a generally thinner neck back surface 25C, as shown in FIGS. 3 and 5, and the neck 25 may comprise a comparatively wider first side neck surface 25B, and a comparatively wider second side neck surface 25B as shown in FIG. 4. The neck 25 may facilitate a user carrying the adapter 100 and the first and second neck side surfaces 25B may be tapered to meet neck front surface 25A and neck back surface 25C. For example, a user may place the neck 25 between two fingers on their hand so that the side neck profiles 25B generally contact the sides of the fingers, while either the neck front surface 25A or neck back surface 25C may contact the webbing between the user's fingers. In further embodiments, a neck 25 may comprise generally thinner side neck profiles 25B and comparatively wider neck front surface 25A and neck back surface 25C.

Figure 7:
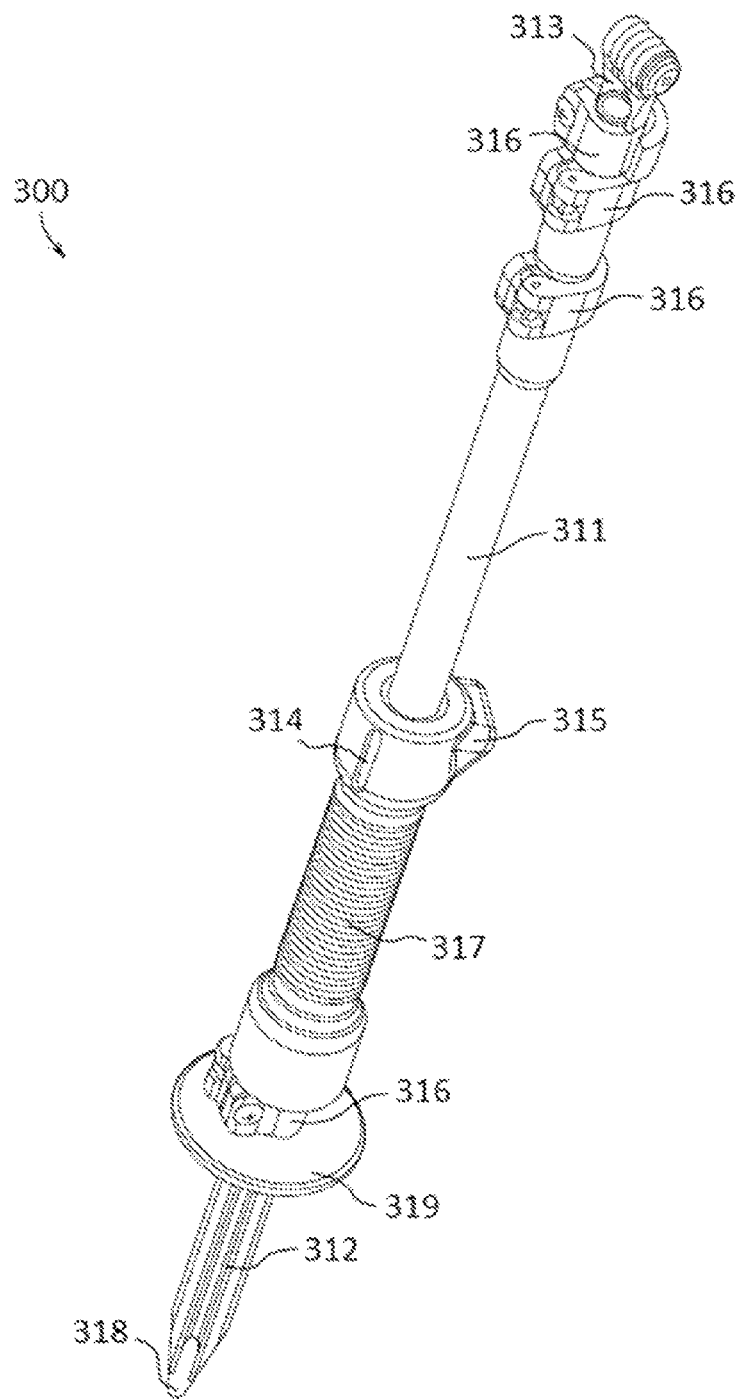
FIG. 7 depicts a perspective view of an example of a collapsible pole in a collapsed position according to various embodiments described herein.
Figure 8:
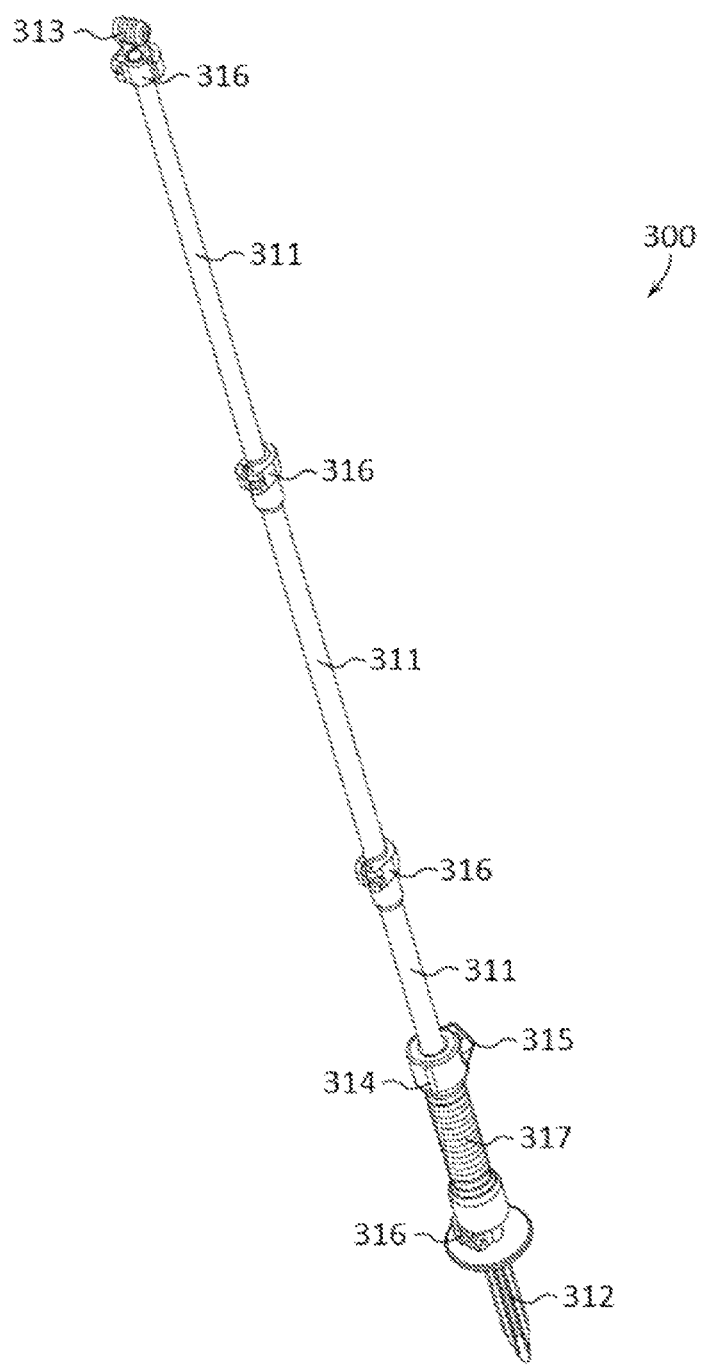
FIG. 8 illustrates a perspective view of an example of a collapsible pole in an extended position according to various embodiments described herein.

Turning now to FIG. 7, a perspective view of an example of a collapsible pole 300 in a collapsed position, and to FIG. 8, a perspective view of an example of a collapsible pole 300 in an extended position according to various embodiments described herein are depicted. The collapsible pole 300 may comprise a plurality of tube segments 311 (three segments shown in FIG. 8) and in preferred embodiments can be extended from 14 inches up to 60 inches in length. In other embodiments, the collapsible pole 300 may comprise between two and seven tube segments 311. In some further embodiments, the collapsible pole 300 may be extended and collapsed between 5 inches and 72 inches.

Tube segments 311 may be made from aluminum, carbon fiber, steel, fiberglass, or any other suitable material that is preferably lightweight yet strong enough to support varying degrees of weight so that a user may lean on or place camera cases, cameras, camping equipment and the like. The tube segments 311 are sized to fit closely together in a telescoping manner. In some embodiments, the largest tube segment 311 has a maximum diameter of about 1 inch with the diameter decreasing by one eighth of an inch from one tube segment 311 to the next. In other embodiments, the maximum tube segment 311 diameter may be between one half of an inch and two inches, with the diameter decreasing by one sixteenth of an inch to one half of an inch from one tube segment 311 to the next.

The collapsible pole 300 may be configured with one or more attachment elements such as a ground stake attachment 312, a grapple attachment 400 (FIGS. 12 and 13) a camera mount attachment 313, a slot 314, and/or a platform 315. In this example, the collapsible pole 300 is configured with ground stake attachment 312 on a first end and a camera mount attachment 313 on a second end. In preferred embodiments, a tube segment 311, a ground stake attachment 312, a grapple attachment 400, and/or a camera mount attachment 313 are able to temporarily secure to each other by a pressure fit or by a cam lever lock 316 connection that engages or disengages upon a clockwise or counterclockwise twisting motion of the lever of a cam lever lock 316 relative to a tube segment 311. A cam lever lock 316 may be positioned on the end of one or more tube segments 311. When in an unlocked position, a cam lever lock 316 may allow two tube segments 311 to move relative to each other, allow a camera mount attachment 313 to move relative to or disengage from a tube segment 311, allow a grapple attachment 400 to move relative to or disengage from a tube segment 311, or allow a ground stake attachment 312 to move relative to or disengage from a tube segment 311. Conversely, when in an locked position, a cam lever lock 316 may not allow two tube segments 311 to move relative to each other, not allow a camera mount attachment 313 to move relative to or disengage from a tube segment 311, not allow a grapple attachment 400 to move relative to or disengage from a tube segment 311, or not allow a ground stake attachment 312 to move relative to or disengage from a tube segment 311. Cam lever locks 316, camera mount attachments 313, and ground stake attachments 312 may be made from aluminum, polycarbonate, glass-filled plastic, rubber, or any other suitable type of material.

In other embodiments, a tube segment 311, a grapple attachment 400 (FIGS. 12 and 13), a ground stake attachment 312, and/or a camera mount attachment 313 are able to temporarily secure to each other with a clasp type connection method, combination lock type connection method, push-to-lock type connection method, a turn-to-lock type connection method, slide-to-lock type connection method or any other suitable temporary connection method as one reasonably skilled in the art could envision to serve the same function.

In preferred embodiments, a collapsible pole 300 may comprise one or more handle grips 317. A handle grip 317 is configured to provide an ergonomic location for a user to grasp the collapsible pole 300. The handle grip 317 may be made from hard plastics, hard rubber, metal and metal alloys, wood, carbon fiber, fiberglass, resins, ceramics, soft plastics, soft rubbers, silicone, or any other suitable material including combinations of materials.

Figure 9:
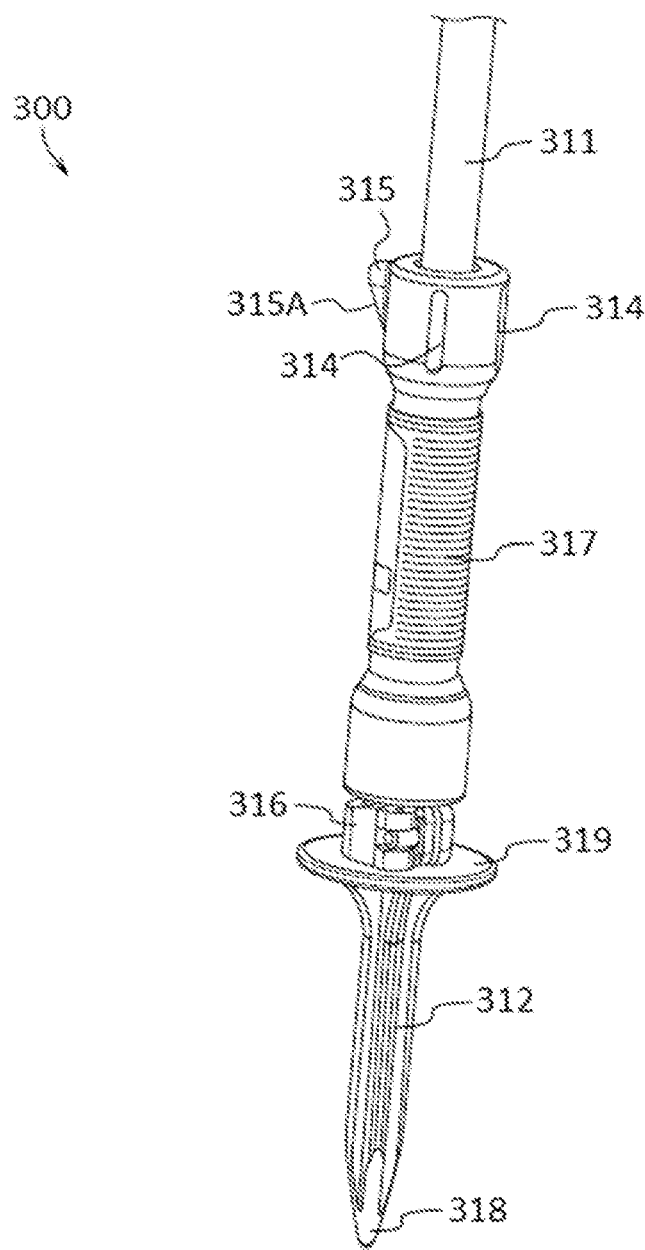
FIG. 9 shows a perspective view of an example of a ground stake joined to a bottom end of a collapsible pole according to various embodiments described herein.
Figure 10:
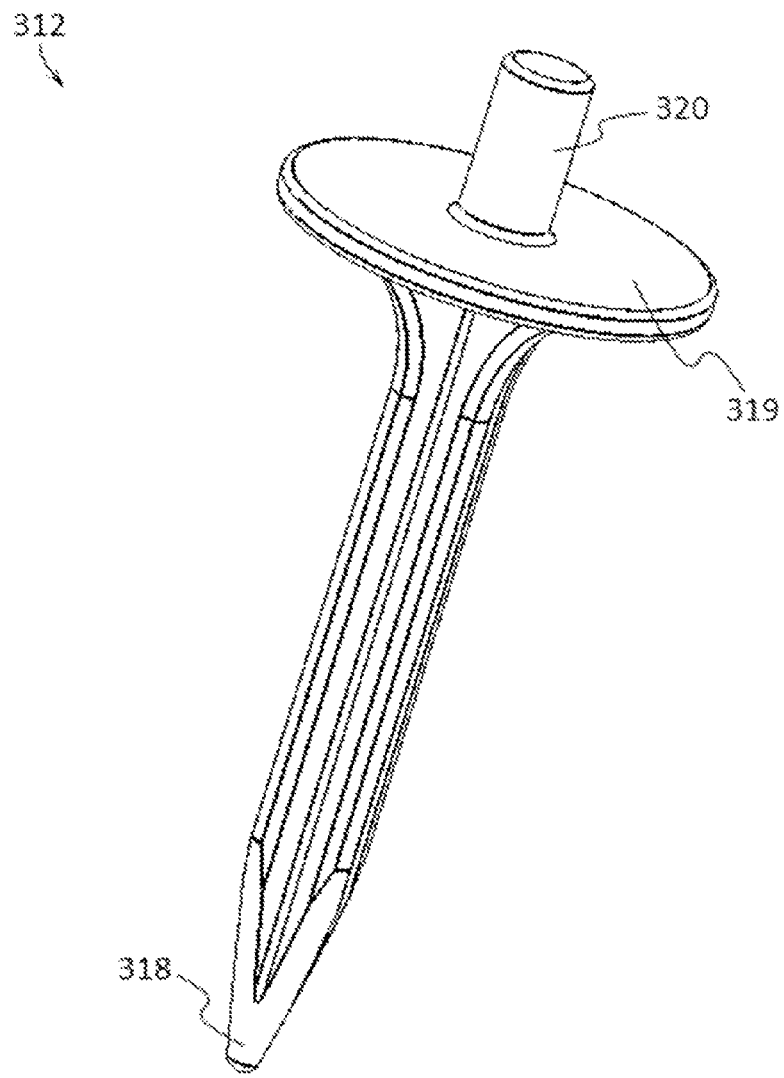
FIG. 10 depicts a perspective view of an example of a ground stake according to various embodiments described herein.

A collapsible pole 300 may also comprise one or more slots 314 and/or platforms 315 which may optionally be positioned on a handle grip 317 or anywhere on the collapsible pole 300 as shown in FIGS. 7-9. A platform 315 may comprise a generally planar surface 315A which may be configured to receive items such as a remote control for cameras, video recorders, and the like. In preferred embodiments, the planar surface 315A of the platform 315 may be angled approximately 20 degrees away from the handle grip 317 a tube segment 311 of the collapsible pole 300. In other embodiments, the planar surface planar surface 315A of the platform 315 may be angled approximately 0 to 90 degrees away from the handle grip 317 or a tube segment 311 of the collapsible pole 300. In further embodiments, the planar surface of the platform 315 may comprise a hinged other connection to a handle grip 317 or a tube segment 311 allowing the planar surface of the platform 315 to be pivoted in a range of approximately 0 to 90 degrees away from a handle grip 317 or a tube segment 311 of the collapsible pole 300. A platform 315 may be made from hard plastics, hard rubber, metal and metal alloys, wood, carbon fiber, fiberglass, resins, ceramics, soft plastics, soft rubbers, silicone, or any other suitable material including combinations of materials.

One or more slots 314 may be placed anywhere on a handle grip 317 or a tube segment 311, but preferably in proximity to a platform 315. A slot 314 may form an opening or channel that may optionally connect to another slot 314 providing an opening configured to accept webbing straps, Velcro straps, or other similar attachments that may be used to secure a remote control for cameras, video recorders, and the like to a platform 315.

A ground stake attachment 312 may comprise a stake tip 318, configured to penetrate substrates, and a stake guard 319, configured to arrest the penetration of the ground stake attachment 312 into a substrate as shown in FIGS. 7-10. In preferred embodiments, a ground stake attachment 312 may comprise an attachment extension 320 (FIG. 10) which may be used to temporarily attach a ground stake attachment 312 to a camera mount attachment 313, handle grip 317, cam lever lock 316, or a tube segment 311. Preferably, a portion or all of an attachment extension 320 may be inserted in to a cam lever lock 316 that is attached to a camera mount attachment 313, a handle grip 317, or a tube segment 311, and by actuating the cam lever lock 316, the ground stake attachment 312 may be secured or attached to the respective element.

In some embodiments, a ground stake attachment 312 may be temporarily attached to a tube segment 311 or a handle grip 317 of a collapsible pole 311 with a cam lever lock 316. In other embodiments, a ground stake attachment 312 may be temporarily attached to a camera mount attachment 313, a tube segment 311, or a handle grip 317 of a collapsible pole 311 with a clasp type connection method, combination lock type connection method, push-to-lock type connection method, a turn-to-lock type connection method, threaded type connection method, slide-to-lock type connection method or any other suitable temporary connection method as one reasonably skilled in the art could envision to serve the same function.

In further embodiments, a ground stake attachment 312 may be permanently attached to a camera mount attachment 313, a tube segment 311 or a handle grip 317 of a collapsible pole 311 with heat bonding, chemical bonding, adhesives, clasp type fasteners, clip type fasteners, rivet type fasteners, threaded type fasteners, other types of fasteners, by being integrally molded or formed together, or with any other suitable permanent joining method. A ground stake attachment 312 may be made from hard plastics, hard rubber, metal and metal alloys, wood, carbon fiber, fiberglass, resins, ceramics, or any other suitable material including combinations of materials.

Figure 11:
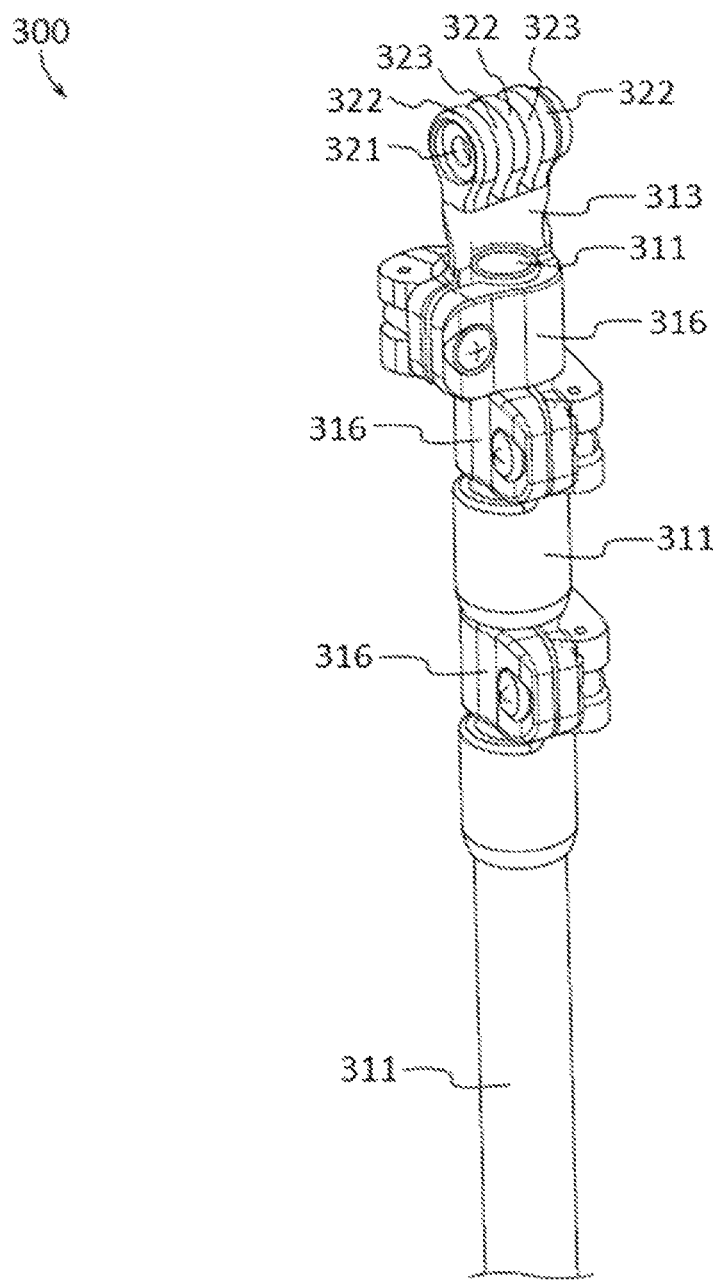
FIG. 11 depicts a perspective view of an example of top end of a collapsible pole according to various embodiments described herein.

FIG. 11 depicts a perspective view of an example of top end of a collapsible pole 300 with a camera mount attachment 313 according to various embodiments described herein. The camera mount attachment 313 may comprise one or more camera mount attachment vertical prongs 322 and one or more camera mount attachment cavities 323 that are configured to attach to two vertical prongs which typically comprise fastener apertures and which are found on cameras and camera cases common in the art. In preferred embodiments, the vertical prongs of a camera may be placed into the camera mount attachment cavities 323 and in contact with the camera mount attachment vertical prongs 322. A camera mount attachment fastener aperture 321 may pass through each of the camera mount attachment vertical prongs 322. A fastener such as a screw or bolt may then be passed through the camera mount attachment fastener aperture 321 of the camera mount attachment vertical prongs 322 and through fastener apertures on vertical prongs of the camera or camera case. The fastener may be secured by a nut type fastener to allow a camera attached to the camera mount attachment 313 to swivel or rotate around the axis provided by the fastener.

In preferred embodiments, a camera mount attachment 313 may comprise three camera mount attachment vertical prongs 322 with the outer camera mount attachment vertical prongs 322 optionally comprising greater width than the camera mount attachment vertical prongs 322. In other embodiments, one or more outer camera mount attachment vertical prongs 322 may comprise a similar width as one or more inner camera mount attachment vertical prongs 322. In further embodiments, one or more outer camera mount attachment vertical prongs 322, inner camera mount attachment vertical prongs 322, and/or camera mount attachment cavities 323 may comprise any size or shape configured to receive and secure one or more vertical prongs or other similar attachments found on cameras, camera case, and like devices common in the art such as a clip attachment, threaded attachment, a ballhead mount, a pan-tilt mount, and a strap or webbing mount.

Also in preferred embodiments, a camera mount attachment 313 may be temporarily attached to a ground stake attachment 312, a tube segment 311, or a collapsible pole 300 with a cam lever lock 316. A camera mount attachment 313 may comprise a cam lever lock 316 that is able to accept or receive portions of a ground stake attachment 312 such as an attachment extension 320, a grapple attachment 400, or a collapsible pole 300 such as a tube segment 311. By tightening the cam lever lock 316, a camera mount attachment 313 may be secured to a receive portion of a ground stake attachment 312 such as an attachment extension 320, a grapple attachment 400, or a collapsible pole 300 such as a tube segment 311. Conversely, by loosening the cam lever lock 316, a camera mount attachment 313 may be moved or positioned relative to a receive portion of a ground stake attachment 312 such as an attachment extension 320, a grapple attachment 400, or a collapsible pole 300 such as a tube segment 311.

In other embodiments, a camera mount attachment 313 may be temporarily attached to a ground stake attachment 312, a grapple attachment 400, a tube segment 311, a handle grip 317, or a collapsible pole 311 with a clasp type connection method, combination lock type connection method, push-to-lock type connection method, a turn-to-lock type connection method, a threaded connection method, slide-to-lock type connection method or any other suitable temporary connection method as one reasonably skilled in the art could envision to serve the same function. In other embodiments, a camera mount attachment 313 may comprise an aperture preferably on the bottom and opposite the camera mount attachment vertical prongs 322 that is capable of receiving portions of a tube segment 311 or an attachment extension 320. Portions of a tube segment 311 or an attachment extension 320 may be press fit and frictionally secured into an aperture of a camera mount attachment 313 thereby temporarily securing a tube segment 311 or an attachment extension 320 to a camera mount attachment 313.

In still further embodiments, a camera mount attachment 313 may be permanently attached to a ground stake attachment 312, a grapple attachment 400, a tube segment 311, a handle grip 317, or a collapsible pole 311 with heat bonding, chemical bonding, adhesives, clasp type fasteners, clip type fasteners, rivet type fasteners, threaded type fasteners, other types of fasteners, by being integrally molded or formed together, or with any other suitable permanent joining method. A ground stake attachment 312 may be made from hard plastics, hard rubber, metal and metal alloys, wood, carbon fiber, fiberglass, resins, ceramics, or any other suitable material including combinations of materials.

Figure 12:
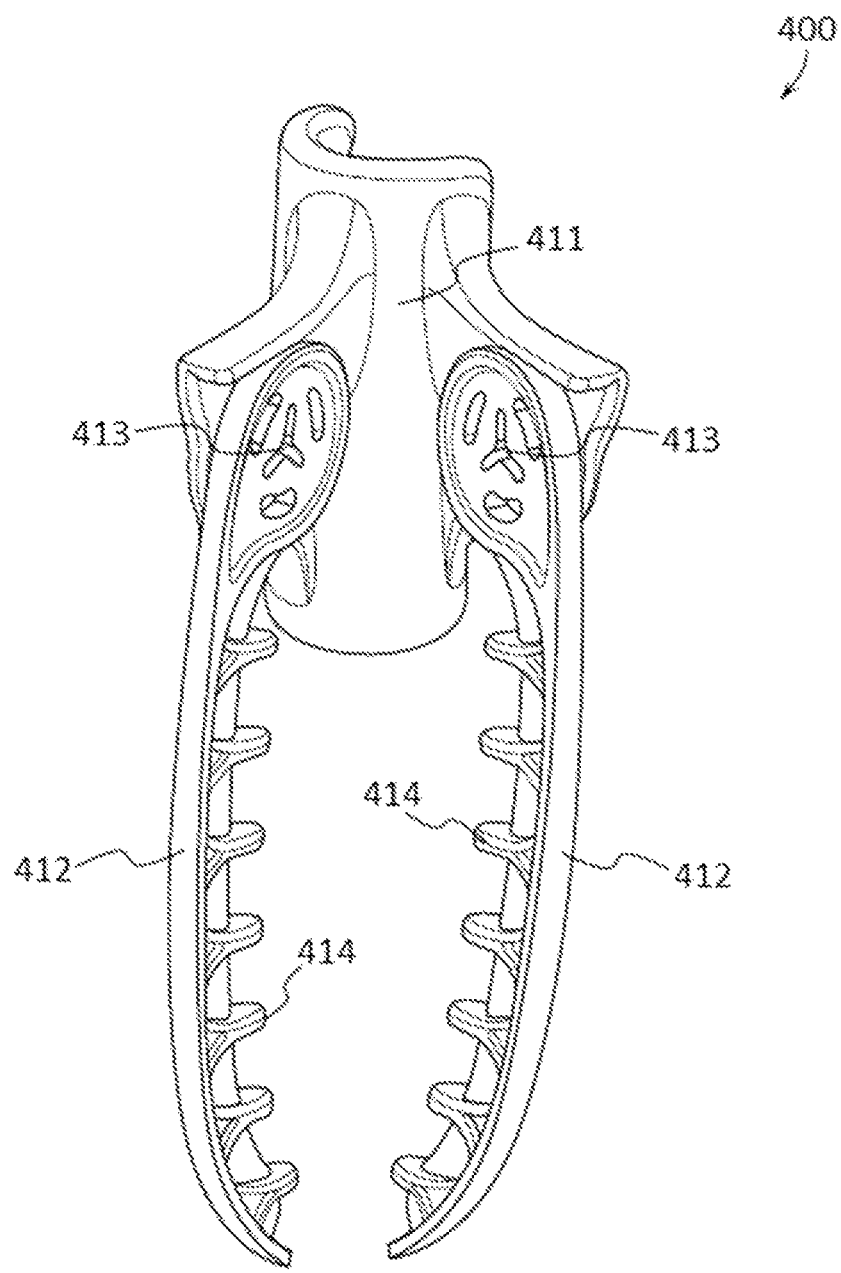
FIG. 12 illustrates a perspective view of an example of a grapple attachment in a closed position according to various embodiments described herein.

FIG. 12 illustrates a perspective view of an example of a grapple attachment 400 in a closed position according to various embodiments described herein. In preferred embodiments, a grapple attachment 400 may comprise a grapple collar 411 and two grappling arms 412. In other embodiments, a grapple attachment 400 may comprise one or more grapple collars 411 and/or grappling arms 412. The grapple arms 412 may be movable from a closed position as shown in FIG. 11 to an open position as illustrated in FIG. 12, and may be pivotally connected to the grapple collar 411 at a pivot attachment point 413 such as a swivel so that they are able to fold into the grapple collar 411 for storage, and out from the grapple collar 411 to secure to various structures and objects. In preferred embodiments, the pivot attachment point 413 may comprise a hand tightenable fastener such a wingnut and bolt fastener, a hand screw fastener, or any other hand tightenable type of movable attachment or fastener that may be suitable for controlling the movement of a grapple arm 412. In other embodiments, the pivot attachment point 413 may comprise any type of movable attachment or fastener that may be suitable for controlling the movement of a grapple arm 412. A grappling arm 412 may have a generally hook shape or any other shape, and may comprise a serrated edge comprising one or more teeth 414 on the inside curve of the grappling arm 412. In other embodiments, one or more grappling arms 412 may be in a fixed position and not movable.

Figure 13:
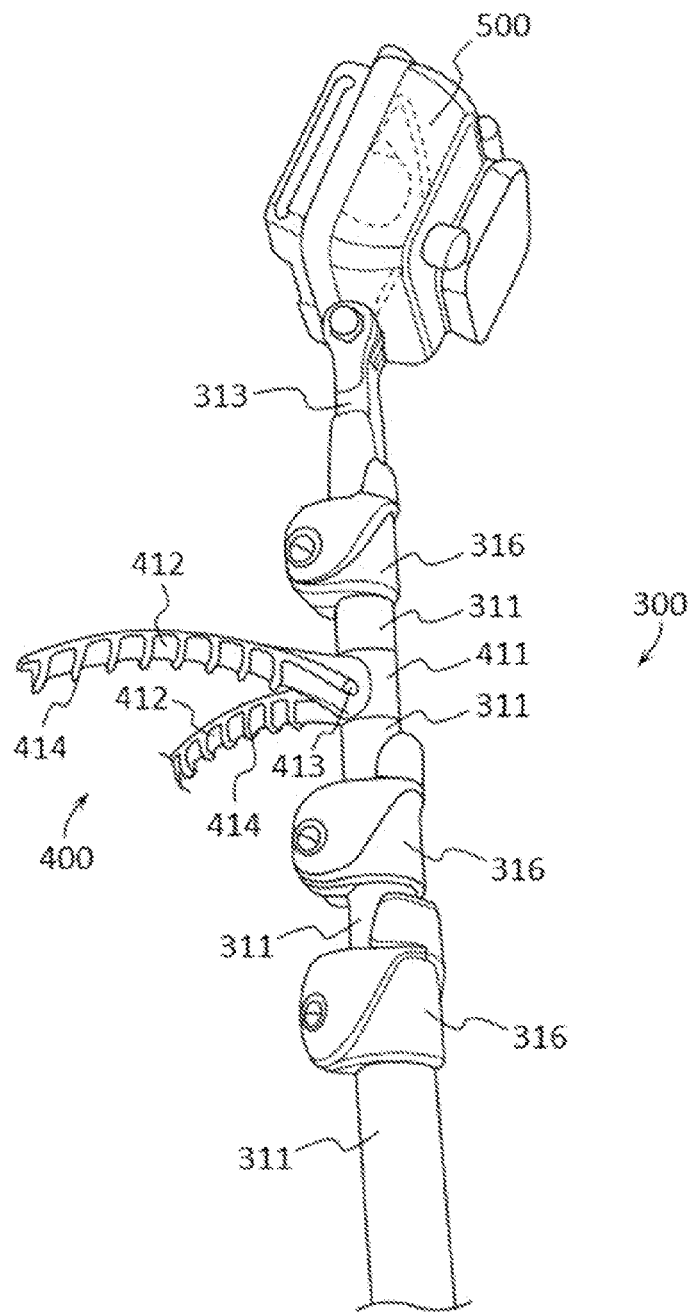
FIG. 13 illustrates a perspective view of an example of a grapple attachment in an open position joined to a collapsible pole according to various embodiments described herein.

FIG. 13 illustrates a perspective view of an example of a grapple attachment 400 in an open position and a camera mount attachment 313, securing a camera case 500, with both the grapple attachment 400 and camera mount attachment 313 joined to a collapsible pole 300 according to various embodiments described herein. In preferred embodiments, a grapple attachment 400 may be temporarily secured to a collapsible pole 300 by press fitting the grapple collar 411 to a tube segment 311. In other embodiments, a grapple collar 411 may be attached to a tube segment 311 of a collapsible pole 311 with a cam lever lock 316, clasp type connection method, combination lock type connection method, push-to-lock type connection method, a turn-to-lock type connection method, cam level lock connection method, slide-to-lock type connection method or any other suitable temporary connection method as one reasonably skilled in the art could envision to serve the same function. In further embodiments, a grapple collar 411 may be permanently attached to a tube segment 311 of a collapsible pole 311 with heat bonding, chemical bonding, adhesives, clasp type fasteners, clip type fasteners, rivet type fasteners, threaded type fasteners, other types of fasteners, by being integrally molded or formed together, or with any other suitable permanent joining method. A grapple collar 411 may be made from hard plastics, hard rubber, metal and metal alloys, wood, carbon fiber, fiberglass, resins, ceramics, or any other suitable material including combinations of materials.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A mouth adapter configured to secure a portable camera to a mouth of a user, the mouth adapter comprising:
   a. a first bite wing;
   b. a second bite wing;
   c. an air channel located between said first bite wing and said second bite wing;
   d. an adapter arm having a first end, a curved neck, and a second end with said first end coupled to said first bite wing and to said second bite wing; and
   e. a camera mount coupled to said second end of the adapter arm at a position below and spaced apart from the first and second bite wings so that the portable camera may be held in a position below the mouth of the user.

2. The mouth adapter according to claim 1, wherein the first bite wing and second bite wing are elongated.

3. The mouth adapter according to claim 1, wherein the first bite wing and second bite wing comprise a bite surface.

4. The mouth adapter according to claim 3, wherein the bite surface comprises a resilient material configured to form recessed cavities which align with protruding teeth of the user.

5. The mouth adapter according to claim 4, wherein the bite surface comprises an elastic polymer.

6. The mouth adapter according to claim 5, wherein the elastic polymer is over molded to a distal end of the first bite wing and a distal end of the second bite wing.

7. The mouth adapter according to claim 1, wherein the adapter arm further comprises a first balance ridge and a second balance ridge protruding from the first end of the adapter arm at a position between the first and second bite wings and the curved neck.

8. The mouth adapter according to claim 7, further comprising an air groove between said first and second balance ridges.

9. The mouth adapter according to claim 1, further comprising an air groove formed within the first end of the adapter arm located proximate to intersection of said first and second bite wings.

10. The mouth adapter according to claim 1, wherein the neck comprises a first side neck surface and second side neck surface with said first side neck surface and said second side neck surfaces tapered to meet a neck front surface and a neck back surface.

11. The mouth adapter according to claim 1, wherein the camera mount comprises a first outer vertical prong, a second outer vertical prong, an inner vertical prong, and prong cavities located between said first and second outer vertical prongs and said inner vertical prong.

12. The mouth adapter according to claim 11, wherein the first outer vertical prong and second outer vertical prong each have a width greater than a width of the inner vertical prong.

13. A mouth adapter configured to secure a portable camera to a mouth of a user, the mouth adapter comprising:
   a. a first bite wing;
   b. a second bite wing;
   c. an air channel located between said first bite wing and said second bite wing;
   d. an adapter arm having a first end and a second end with said first end coupled to said first bite wing and to said second bite wing;
   e. a camera mount coupled to the second end of the adapter arm;
   f. a first balance ridge protruding from the first end of the adapter arm and a second balance ridge spaced apart from said first balance ridge also protruding from the first end of the adapter arm; and
   g. an air groove positioned between said first balance ridge and said second balance ridge on the first end of the adapter arm.

14. The mouth adapter of claim 13, wherein the adapter arm comprises a neck positioned between said first and said second end.

15. The mouth adapter of claim 14, wherein the neck is non-linear.

16. The mouth adapter of claim 14, wherein the neck is curved.

17. The mouth adapter of claim 14, wherein the neck comprises a first side neck surface and a second side neck surface with the first and second side neck surfaces tapered to meet a neck front surface and a neck back surface.

18. The mouth adapter of claim 13, wherein the camera mount comprises a first outer vertical prong, a second outer vertical prong, an inner vertical prong, and prong cavities located between said first and second outer vertical prongs and said inner vertical prong.

* * * * *